Oct. 2, 1951     O. CARDELL     2,569,707
MOTION MECHANISM
Filed March 25, 1949
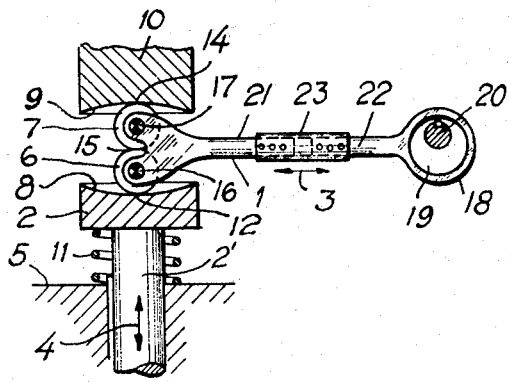
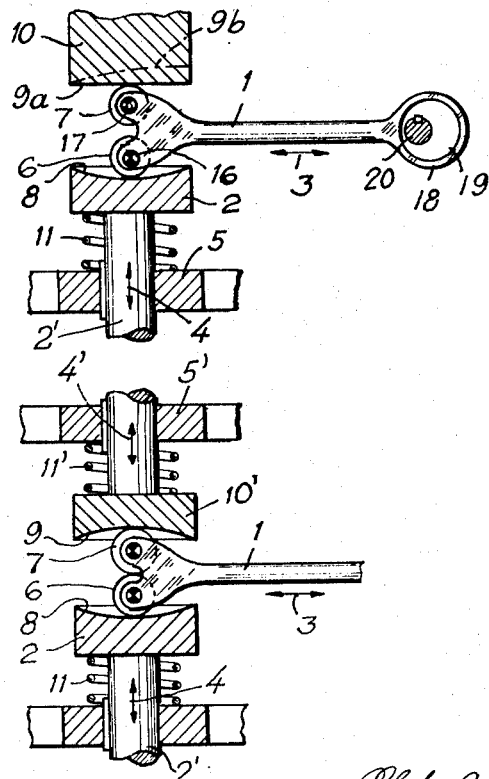
INVENTOR:
Olof Cardell,
BY:
Pierce, Scheffler & Parker
Attorneys.

Patented Oct. 2, 1951

2,569,707

UNITED STATES PATENT OFFICE 2,569,707

MOTION MECHANISM

Olof Cardell, Detroit, Mich., assignor of one-half to Sven Goran Kihlberg, Hjo, Sweden Application March 25, 1949, Serial No. 83,409
In Sweden February 22, 1949

9 Claims. (Cl. 74—44)

The present invention relates to motion transmitting mechanisms of the type in which the movement of a primary member reciprocable in a certain main direction is transmitted to a secondary member guided in another direction, by means of a rolling body which mediates the movement while rolling along a surface of the secondary member.

One object of the invention is to provide a simple construction of a motion mechanism of the type referred to.

A further object of the invention is to construct the motion mechanism in such a manner that the friction losses of the transmission become low.

A still further object of the invention is to realize the transmission of movement while relatively large forces actuate the secondary member.

A distinguishing feature of the invention is that the rolling body is journalled in the primary member. The rolling body which may be a ball or a roller having a straight or curved generatrix will thus be positively guided relatively to the primary member while rolling along the curved surface of the secondary member. The reactive force may be taken up by another rolling body which suitably is also journalled in the primary member and which is adapted to engage a surface of a support member. This surface may be plane or curved or is suitably concave in a direction toward the rolling body. Preferably, the rolling bodies may engage each other so that they will roll in engagement during the movement, the point or line of engagement between the rolling bodies being located on or in the proximity of the line of connection between the contact points of the rolling bodies on the surfaces of the secondary member and the support body. Clearances may be provided in the bearings of the rolling bodies, and this together with the contact between the rolling bodies brings the advantage that the bearings of the rolling bodies are relieved to an essential extent.

The invention will be elucidated hereinafter by a few examples of embodiment which are illustrated in the accompanying drawing. Figs. 1 to 3 show each diagrammatically an embodiment in elevation (partly in section) on a plane containing the directions of movement of the primary member and secondary member.

In the drawing, the primary member is designated by 1 and the secondary member by 2. The primary member is arranged to move back and forth in a direction marked by the double arrow 3 or in directions, the average position of which is marked by this double arrow. The secondary member is guided for movement back and forth in a direction marked by the double arrow 4. The guiding action is taken to be effected by the fact that a rod 2' on the secondary member is displaceably but non-rotatably mounted in a bore in a fixed guide member 5. A rolling body 6, such as a roller, ball or the like (of a cylindrical, concave or convex curvature) is arranged between a rolling body 7 journalled in the primary member and consisting of for example a roller (of a cylindrical, concave or convex curvature) ball or the like and a surface 8 of the secondary member 2. The rolling body 7 engages a surface 9 of a support member 10. When the primary member 1 moves to and fro, the rolling bodies 6, 7 perform a reciprocating movement, while rolling on the surfaces 8 and 9, the secondary member moving then in the guide direction. The secondary member keeps the rolling body 6 pressed against the surface 8 with a resilient force—brought about here by a spring 11—and the reactive pressure is taken up in the guide direction by a supporting member 10. The supporting member 10 may be a portion of a machine frame or an element mounted in such frame.

In the examples of embodiment shown, the primary member is arranged to move together with the rolling bodies in a principal direction forming a right or approximately right angle with the guide direction for the secondary member 2, that is to say, the directions 3 and 4 form a right or approximately right angle with each other, other angles being conceivable, however.

According to Fig. 1, the surface 8 of the secondary member is curved and concave in a direction toward the rolling body 6. It has its lowest point 12—minimum point—at the center of the guided rod 2' of the secondary member 2. In a similar manner the surface 9 is curved and concave toward the rolling body 7 and has its minimum point 14 opposite the point 12.

In the embodiment according to Fig. 1, the rolling bodies 6, 7 engage one another at a point 15 which lies on the line of connection between the points 12 and 14 in a central position of the primary member. The rolling body 6, 7 will thus roll not only along the surfaces 8, 9 but also in engagement with one another during the movement of the primary member. Further the forces acting in the guide direction of the secondary member 2 will be transmitted between the secondary member 2 and the support member 10 directly by the rolling bodies. If the rolling bodies are journalled in the primary member by pins 16, 17, these pins are not obliged to transmit these forces.

In the embodiment illustrated in Fig. 2, there is a space between the rolling bodies 6, 7 in distinction from Fig. 1, so that the pins 16, 17 of the rolling bodies in this case must transmit forces in the guide direction. However, this arrangement may be advantageous in cases, where a great distance is required between the surfaces, and the diameters of the rolling bodies must be limited below a certain value. The curved surface of the support member 10 has here been substituted by a plane surface 9a, which may be inclined to the direction of movement as indicated by the chain dotted line 9b.

The support member 10 is stationary, in the embodiments illustrated in Figs. 1 and 2, but in certain cases it is desirable to provide a support member movable like the secondary member 2. This embodiment is illustrated in Fig. 3, in which the movable support member is designated with 10', a guide for the latter with 5' and a spring mounted between the guide and the support member with 11'. The movement of the primary member 1 in the direction indicated by the double arrow 3 may cause a movement of the support member as indicated by the double arrow 4'.

The primary member may have a rectilinear movement in the direction indicated by the double arrow 3 but the mechanism has also the advantage that it permits movements of the primary member which differ from the rectilinear movement, since the primary member is able to swing up and down while reciprocating. Therefore, the primary member may be constituted by or be directly connected with the eccentric rod or connecting rod of an eccentric or crank driving mechanism imparting the reciprocating movement to the primary member. In Figs. 1 and 2, the primary member is shown as directly connected with an eccentric strap 18 on an eccentric 19, which is keyed to a shaft 20 which may be driven by a suitable engine. Naturally, a driving mechanism of this design runs very lightly. If the pressure during work acts upwardly in the guide direction, for example, because the secondary member carries a tool in operation, only a portion of this pressure is transmitted to the driving mechanism, since the greater portion is taken up by the support member 10, namely, by way of the rolling bodies 6 and 7, whereby the friction losses may be kept low also in the driving mechanism.

The range of movement of the primary member and thus of the rolling body 6, 7 relatively to the surfaces 8 and 9 may be adjusted by displacement of the primary member and its driving mechanism in one direction or the other in the main direction of movement of the primary member. If the primary member is adjusted so that the rolling bodies 6, 7 move to the same extent at both sides of the minimum points 12, 14 (Fig. 1), the number of strokes of the secondary member 2 is doubled as compared with the number of strokes in the case, where the primary member has been displaced in one direction or the other to such an extent that the rolling bodies always move at one side or the other of the minimum points. Optionally, the displacement can be realized by composing the eccentric rod or connecting rod of the primary member from two parts 21, 22, Fig. 1, which are adjustably connected with each other by a sleeve 23.

The invention is not limited to the illustrated embodiments. Various combinations of the embodiments shown are of course conceivable. For example, in the embodiments shown in Figs. 1 and 3, the support member may have a plane surface or optionally an oblique surface as indicated in Fig. 2.

The motion mechanism may be brought into use in a great variety of machines for different purposes, for instance in riveting machines, plate shearing machines, sewing machines, valve mechanisms for engines of different kind and so forth.

What I claim is:

1. A motion-transmitting mechanism, comprising a primary member reciprocable in a certain main direction, a secondary member guided for reciprocation in a direction different from said main direction, a rolling body mounted in the primary member and continuously engaging a surface on the secondary member, said surface being concave in a direction toward the rolling body, and means to reciprocate the primary member to establish a reciprocating movement of said rolling body to each side of a neutral position coincident with the lowest point on said concave surface, the rolling body being adapted to transmit this reciprocation to the secondary member, when said body is rolling in contact with the curved surface.

2. A motion-transmitting mechanism, comprising a primary member reciprocable in a certain main direction, a secondary member guided in a direction different from said main direction, a support member forming a support surface in the guide direction, a rolling body journalled on the primary member and supported by the support member and continuously engaging a curved surface on the secondary member concave in the direction toward said rolling body, spring means for applying pressure in the guide direction to effect pressure between the secondary member, the rolling body and the support member, and means to reciprocate the primary member and the rolling body to impart movement to the secondary member as the rolling body is rolling in contact with the curved surface, the reciprocating stroke of said rolling body being to each side of a neutral position coincident with the lowest point on said concave surface.

3. A motion-transmitting mechanism, comprising a primary member reciprocable in a certain main direction, a secondary member guided in a direction different from said main direction, a stationary support member forming a bearing surface in the guide direction, rolling bodies journalled on the primary member, one in continuous engagement with said bearing surface and another in continuous engagement with an opposite surface on the secondary member, one of said surfaces being concavely curved toward the rolling bodies, spring means applying pressure in the guide direction to the secondary member to effect pressure contact between the secondary member and the rolling body engaging said member and between the support member and the rolling body engaging its bearing surface, and means to reciprocate the primary member and the rolling bodies to impart movement to the secondary member as the rolling bodies are rolling in contact with the bearing surface and the surface of the secondary member, the reciprocating stroke of said rolling bodies being to each side of a neutral position coincident with the lowest point on said concave surface.

4. A motion-transmitting mechanism, comprising a primary member reciprocable in a certain main direction, a secondary member guided for movement in a direction different from said main direction, a support member forming a bearing surface in the guide direction, rolling bodies carried rotatably by the primary member, said rolling bodies having peripheral contact with one another and one of said bodies engaging the bearing surface and another engaging an opposite surface on the secondary member, one of said surfaces being concavely curved toward the rolling bodies, spring means for applying pressure in the guide direction to the secondary member to effect pressure contact between the secondary member and the rolling body engaging said member and between the support member and the rolling body engaging its bearing surface, and means to reciprocate the primary member and the rolling bodies to impart movement to the secondary member as the rolling bodies are rolling in contact with the bearing surface and the surface of the secondary member.

5. A motion-transmitting mechanism, comprising a primary member reciprocable in a certain main direction, a secondary member guided for movement in a direction different from said main direction, a support member forming a bearing surface in the guide direction, rolling bodies carried rotatably by the primary member, said rolling bodies having peripheral contact with one another and one of said bodies engaging the bearing surface and another engaging an opposite surface on the secondary member, both of said surfaces being concavely curved toward the rolling bodies, spring means for applying pressure in the guide direction to the secondary member to effect pressure contact between the secondary member and the rolling body engaging said member and between the support member and the rolling body engaging its bearing surface, and means to reciprocate the primary member and the rolling bodies to impart movement to the secondary member as the rolling bodies are rolling in contact with the bearing surface and the surface of the secondary member.

6. A motion-transmitting mechanism, comprising a primary member reciprocable in a certain main direction, a secondary member guided for movement in a direction different from said main direction, a support member forming a bearing surface in the guide direction, rolling bodies carried rotatably by the primary member, said rolling bodies having peripheral contact with one another and one of said bodies engaging the bearing surface and another engaging an opposite surface on the secondary member, one of said surfaces being concavely curved toward the rolling bodies, spring means for applying pressure in the guide direction to the secondary member to effect pressure contact between the secondary member, and means to adjust the primary member relatively to the secondary member to displace the centre of the reciprocating motion of the rolling bodies relatively to the minimum point of the curved surfaces engaged by one of said bodies.

7. A motion-transmitting mechanism, comprising a primary member reciprocable in a certain main direction, a secondary member guided for movement in a direction different from said main direction, a support member forming a bearing surface in the guide direction, and movable in said guide direction, rolling bodies carried rotatably by the primary member, said rolling bodies having peripheral contact with one another and one of said bodies engaging the bearing surface and another engaging an opposite surface on the secondary member, one of said surfaces being concavely curved toward the rolling bodies, spring means for applying pressure in the guide direction to the secondary member and the support member to effect pressure contact between the secondary member and the rolling body engaging said member and between the support member and the rolling body engaging its bearing surface, and means to reciprocate the primary member and the rolling bodies to impart movement to the secondary member as the rolling bodies are rolling in contact with the bearing surface and the surface of the secondary member.

8. A motion transmitting mechanism as claimed in claim 3, in which one of the surfaces of the secondary member and the support member have surfaces engaged by the rolling bodies, one of said surfaces being plane.

9. A motion transmitting mechanism as claimed in claim 3, in which one of the surfaces of the secondary member and the support member have surfaces engaged by the rolling bodies, one of said surfaces being inclined to the guide direction.

OLOF CARDELL.

REFERENCES CITED

The following references are of record in the file of this patent:

UNITED STATES PATENTS

| Number | Name | Date |
|---|---|---|
| 1,666,893 | Garrand | Apr. 24, 1928 |
| 1,933,731 | Hanna | Nov. 7, 1933 |
| 2,387,449 | Kaman | Oct. 23, 1945 |

FOREIGN PATENTS

| Number | Country | Date |
|---|---|---|
| 193,944 | Great Britain | Feb. 28, 1923 |